United States Patent [19]

Kissel et al.

[11] Patent Number: 5,586,849
[45] Date of Patent: Dec. 24, 1996

[54] WHEEL RESTRAINT DEVICE AND QUICK-CONNECT HOOKS FOR USE THEREWITH

[75] Inventors: James L. Kissel; Earl J. Dailey; Daniel F. Dolan, all of Rapid City, S. Dak.

[73] Assignee: Rushmore Vehicle Restraints, L.L.C., Rapid City, S. Dak.

[21] Appl. No.: 379,731

[22] Filed: Jan. 27, 1995

Related U.S. Application Data

[63] Continuation-in-part of Ser. No. 291,779, Aug. 17, 1994, abandoned, which is a continuation-in-part of Ser. No. 202,342, Feb. 28, 1994, abandoned.

[51] Int. Cl.⁶ .................................................... B60P 3/06
[52] U.S. Cl. ........................ 410/10; 410/30; 24/698.2; 24/265 CD
[58] Field of Search ................... 24/265 R, 265 H, 24/265 CD, 600.7, 601.3, 601.4, 698.1, 698.2, 410; 410/4, 9, 10, 19, 20, 30, 96, 101, 102

[56] References Cited

U.S. PATENT DOCUMENTS

| | | | |
|---|---|---|---|
| 509,747 | 11/1893 | Mauk | 24/600.9 |
| 1,546,430 | 7/1925 | Blitz | 24/698.2 |
| 1,708,231 | 4/1929 | Moore et al. | |
| 1,708,433 | 4/1929 | Stinson | |
| 1,748,089 | 2/1930 | Stockton | |
| 1,796,607 | 3/1931 | McDowell | 24/698.2 |
| 1,816,897 | 8/1931 | Fedderman et al. | |
| 1,937,769 | 12/1933 | Lute | 188/32 |
| 1,990,562 | 2/1935 | Otis | 105/139 |
| 2,001,935 | 5/1935 | Otis | 105/159 |
| 2,046,855 | 7/1936 | Tobin | 24/265 CD |
| 2,856,865 | 10/1958 | Reynolds et al. | 24/265 CD |
| 3,537,548 | 11/1970 | Jeppesen | 188/32 |
| 3,793,681 | 2/1974 | Casstevens, Jr. et al. | 24/698.2 |
| 3,891,176 | 6/1975 | Downing et al. | 248/340 |
| 3,899,806 | 8/1975 | Berg | 24/241 |
| 3,937,436 | 2/1976 | Stewart | 248/499 |
| 3,953,812 | 4/1976 | Heft et al. | 335/23 |

(List continued on next page.)

FOREIGN PATENT DOCUMENTS

| | | | |
|---|---|---|---|
| 0327212 | 9/1989 | European Pat. Off. | |
| 675784 | 2/1930 | France | |
| 916030 | 11/1946 | France | 24/600.9 |
| 2459151 | 2/1981 | France | |
| 58-93656 | 6/1983 | Japan | |
| 1364511 | 1/1988 | Russian Federation | |
| 1486382 | 6/1989 | Russian Federation | |
| 194659 | 2/1965 | Sweden | 24/600.9 |
| 7803163 | 10/1979 | Sweden | |
| WO79/00130 | 3/1979 | WIPO | |

Primary Examiner—David A. Bucci
Assistant Examiner—Gregory A. Morse
Attorney, Agent, or Firm—Merchant, Gould, Smith, Edell, Welter & Schmidt, P.A.

[57] ABSTRACT

An apparatus designed to restrain wheels and vehicles on a support surface includes an upper restraint supported on a upper outer surface of the wheel; first and second inner flexible members and first and second outer flexible members coupled to and extending from the upper restraint on inner and outer sides of the wheel, respectively; first and second quick-connect hooks respectively securing the inner flexible members to the support surface; first and second adjustment mechanisms respectively securing the outer flexible members to the support surface with the outer flexible members crossing; and first and second lower restraints coupled respectively to the first inner and outer flexible members and the second inner and outer flexible members, and abutting a lower outer surface of the wheel. The quick-connect hooks may include a resilient retaining member such as a coiled spring which permits a free end of the retaining member to be bent in a plurality of directions. Alternatively, the quick-connect hooks may include an additional oppositely-arcuate catch member which maintains the hooks in a generally upright orientation when the hooks are installed on the support surface but no tension is applied to the inner flexible members.

22 Claims, 10 Drawing Sheets

U.S. PATENT DOCUMENTS

| | | | |
|---|---|---|---|
| 3,972,457 | 8/1976 | Kesler | 224/42.42 |
| 4,227,633 | 10/1980 | Sellberg | 224/42.28 |
| 4,399,893 | 8/1983 | Switzer | 188/32 |
| 4,428,512 | 1/1984 | Nosek | 222/402.15 |
| 4,596,506 | 6/1986 | Burgardt et al. | 414/426 |
| 4,659,266 | 4/1987 | Thelen et al. | 410/10 |
| 4,786,223 | 11/1988 | Crissy et al. | 410/20 |
| 4,863,390 | 9/1989 | Cera et al. | 439/100 |
| 4,875,813 | 10/1989 | Moyer et al. | 410/9 |
| 4,955,459 | 9/1990 | Murphy | 188/32 |
| 5,011,347 | 4/1991 | Bullock | 410/9 |
| 5,056,574 | 10/1991 | Maresh et al. | 24/698.2 |
| 5,150,911 | 9/1992 | Williams | 280/502 |
| 5,160,223 | 11/1992 | Seitz | 410/9 |
| 5,201,799 | 4/1993 | Johnson | 60/39.32 |
| 5,261,687 | 11/1993 | Bergman | 280/478.1 |
| 5,294,221 | 3/1994 | Eller et al. | 410/30 |
| 5,302,063 | 4/1994 | Winsor | 410/30 |
| 5,312,213 | 5/1994 | Winsor | 410/9 |
| 5,392,880 | 2/1995 | Christian | 188/32 |

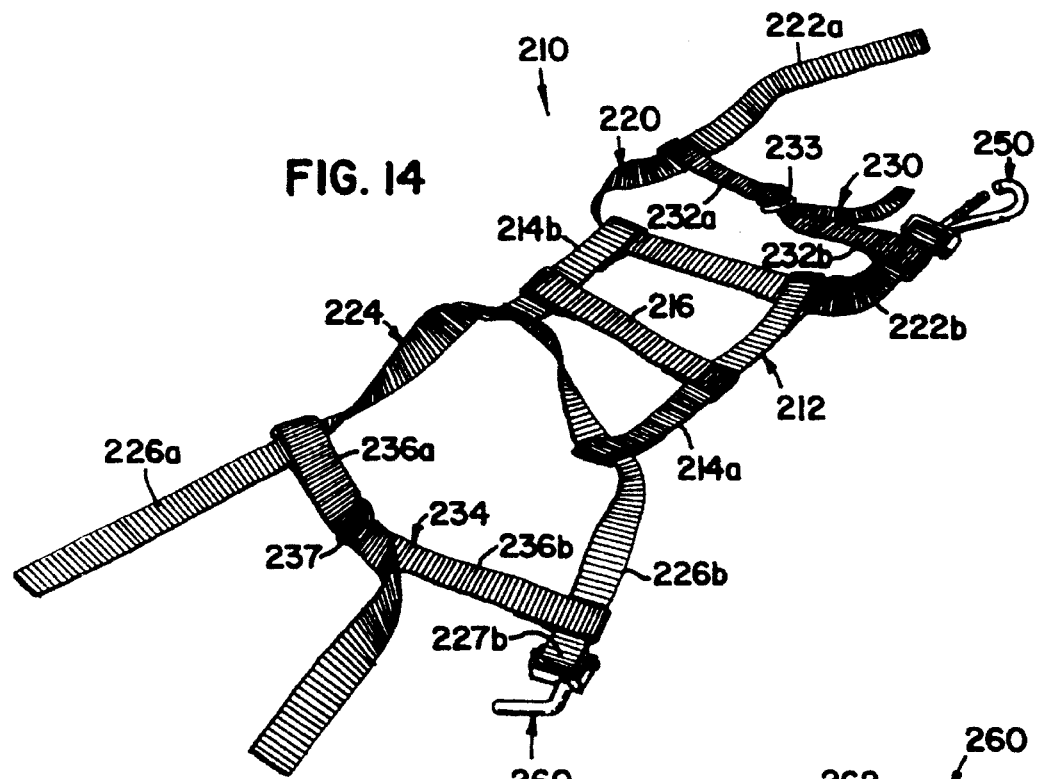
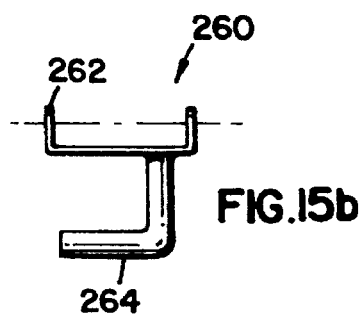
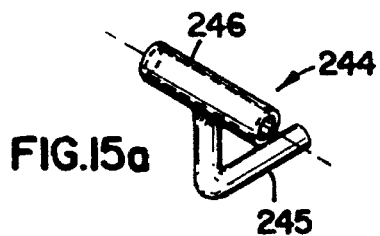
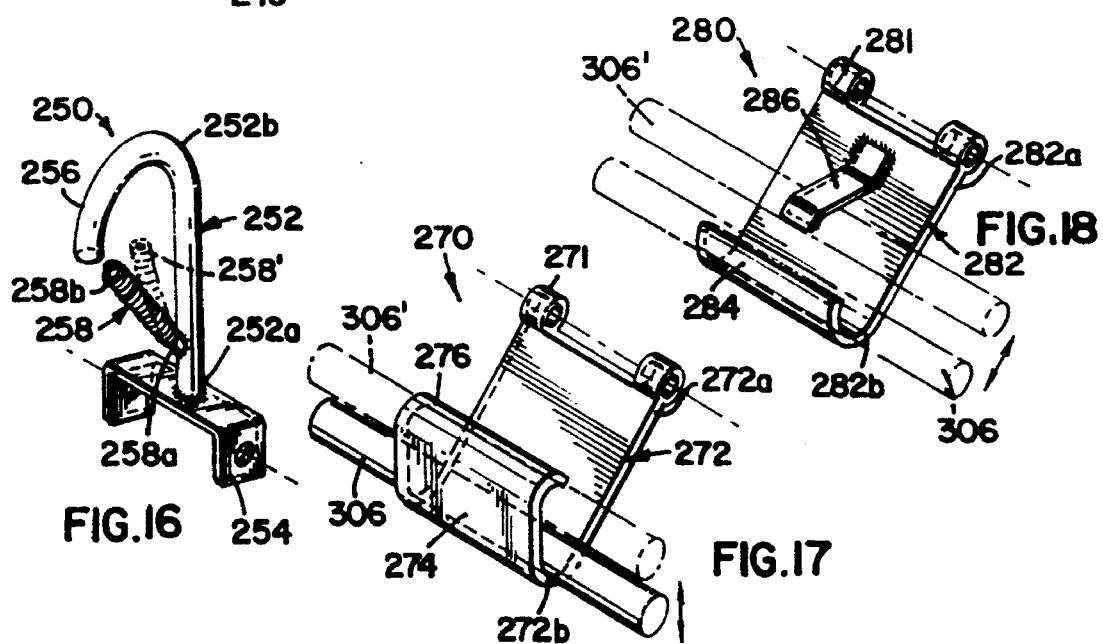

5,586,849

WHEEL RESTRAINT DEVICE AND QUICK-CONNECT HOOKS FOR USE THEREWITH

CROSS REFERENCE TO RELATED APPLICATIONS

This application is a continuation-in-part of U.S. patent application Ser. No. 08/291,779, filed Aug. 17, 1994, now abandoned, which is a continuation-in-part of U.S. patent application Ser. No. 08/202,342, filed Feb. 28, 1994 now abandoned.

FIELD OF THE INVENTION

The present invention relates to the field of wheel restraint and vehicle restraint devices. In particular, the present invention relates to a restraining device for automobiles or trucks which are being transported on trucks, rail, or by ship. The present invention also relates to quick-connect hooks which may be used to retain various objects, e.g., for securing a wheel restraint device to a supporting surface.

BACKGROUND OF THE INVENTION

The safe shipment of vehicles such as cars or light trucks from the manufacturing site to the distributor and ultimately to the customer has always provided a challenge. The mode of transport for automobiles and light trucks in the past has been primarily by tractor-trailer or rail, but in the event of imported cars from overseas, ships are typically used.

Securing the cars to the bed of the truck, train or boat, has typically employed a set of chains. The chains are secured to the floor or bed of the transport vehicle and are attached to a portion of the frame of the transported vehicle. Specifically, a loop or hook of some type has traditionally been welded on some portion of the transported vehicle, so that the vehicle can be "tied down" by chains for transport. Problems associated with the use of chains includes the chains becoming very rusted through exposure to the weather, or developing weak points and thereafter breaking, which results in movement of the cars on the platform, often damaging the cars and also creating safety hazards. Chains can also snap in transit, resulting in damaged vehicles, as well as hazards to the transport vehicle operator. Particularly if vehicles are being transported by a truck, cars could fall off the trucks, injuring or killing occupants in other vehicles.

Another problem associated with the use of chains is the difficulty that the drivers or dock loaders have in securing the chains to the vehicles. In order to attach the chains to the vehicles, it is necessary to get under the car or truck and attach the chain to the car or truck. This is a difficult and a dirty job. Thus, there is a need for an easier way to attach vehicles to platforms for transit.

U.S. Pat. Nos. 1,708,231, 1,816,897, 4,596,506 and 4,955,459 disclose various methods for restraining wheels or vehicles. However, none of these devices can effectively be used for the wide variety of wheels and vehicle designs sold today.

U.S. Pat. No. 4,227,633 discloses a wheel locking device to secure vehicles on transport vehicles. However, the device has a significant shortcoming in that the arm which retains the wheel rotates inward, towards the wheel. Similarly, U.S. Pat. No. 3,537,548 discloses a locking mechanism for impeding the rotation of a vehicle wheel, which includes an outwardly pivoting arm for securing a chain to a vehicle wheel. These devices may not be used for many of today's modern vehicles, which utilize a fender or wheel skirt. Such a skirt, which is commonly found on many of today's vehicles such as a Chevrolet Caprice or a Cadillac DeVille have skirts which hide or shield the upper portion of the wheel. Furthermore, many of the new electric cars which are being prototyped have designs which almost totally encompass the wheel for aerodynamic purposes. Sometimes these skirts are removable, but often times they are not. Thus, there is a need for a wheel restraining device that can be attached to the wheel when a fender or wheel skirt is in place.

Another drawback to many of the above devices is the substantial weight which they add to the transporting vehicle, since any added weight may decrease the fuel economy of the transporting vehicle, among other concerns.

Thus, to date, there exists a need for an economical wheel restraining device which can adapt to many dimensions of a wheel, and can be used on all vehicles.

Also in the general area of restraining cargo such as vehicles, but also including other cargos such as lumber, retaining hooks are often used to secure straps or other restraining mechanisms over cargo to secure the cargo during transport. Often, it is somewhat difficult to connect or disconnect such hooks from the transporting vehicle to which the cargo is to be secured. This may be as a result of the attachment point on the transporting vehicle being hidden from view or difficult to reach. In addition, attaching cargo using straps and the like may require multiple operators to attend to the individual hooks while the straps are tightened, e.g., by a ratcheting mechanism.

Therefore, a need also exists for a quick-connect hook which is easily connectable and disconnectable from a transporting vehicle or other object, and which allows cargo to be secured to a vehicle by a single operator.

SUMMARY OF THE INVENTION

The present invention addresses many of the problems and disadvantages associated with known systems for restraining wheels by securing the wheels of a vehicle with an economical and light weight device which can work on any type of vehicle, regardless of the surrounding mechanical components and body panels which surround the wheel wells of the vehicle. Upper and lower restraints are mounted to at least one inner and at least one outer flexible member, both of which are secured to the supporting surface on which the wheel is supported. When the upper restraint is disposed on an upper outer surface of the wheel, the flexible members pull downward on the wheel, and the lower restraint operates generally as a "chock" and resists rotation or sliding of the wheel by supporting a lower outer surface of the wheel.

Moreover, the inner or outer flexible members may be secured to the supporting surface through a quick-connect retaining hook which permits quick and easy connection and disconnection of the flexible members. In one design of the retaining hook, a resilient retaining member, which is bendable in a plurality of directions, is used to retain the hook on the support surface when no tension is applied to the flexible members. In another design of the retaining hook, an additional oppositely-arcuate catch member is used to maintain the hook in a generally upright orientation when the hook is installed on the support surface but no tension is applied to the flexible members. Either of the hook designs may be used to secure many types of cargo to various objects, such as transporting vehicles.

Therefore, according to one aspect of the invention, a device for restraining a wheel on a vehicle to a support surface on which the wheel is supported is provided, which includes a restraining member, including an upper restraint supported on a upper outer surface of the wheel, inner and outer flexible members coupled to and extending from the upper restraint on inner and outer sides of the wheel, respectively, and a lower restraint coupled to the inner and outer flexible members and abutting a lower outer surface of the wheel; and inner and outer securing means for respectively securing the inner and outer flexible members to the support surface.

According to a further aspect of the invention, a quick-connect retaining hook is provided which includes a support member having first and second ends, the first end including a coupler; a catch member, coupled proximate the second end of the support member; and a resilient retaining member having a fixed and a free end, wherein the retaining member is coupled at the fixed end proximate the first end of the support member and extends toward the catch member, and wherein the retaining member is bendable in a plurality of directions from a closed position to an open position.

According to an additional aspect of the invention, a quick-connect retaining hook for retaining an object is provided which includes a support member having first and second ends, the first end including a coupler; an upwardly arcuate first catch member, coupled proximate the second end of the support member, for retaining an object when tension is applied to the coupler; and retaining means for retaining the hook in a generally upright position, the retaining means including a downwardly arcuate second catch member for retaining the object when tension is not applied to the coupler.

These and other advantages and features, which characterize the invention, are set forth with particularity in the claims appended hereto and forming a further part hereof. However, for a better understanding of the invention, and the advantages and objectives obtained by its use, reference should be made to the drawing, and to the following descriptive matter, in which there is described and illustrated a preferred embodiment of the invention.

BRIEF DESCRIPTION OF THE DRAWING

FIG. 9 is a side elevational view of the embodiment of FIG. 8.

FIG. 14 is a perspective view of the restraining member of the embodiment of FIG. 12. Two alternate securing mechanisms are shown connected to the inner flexible members of the restraining member.

FIG. 15a is a perspective view of an L-hook for use in securing the ratchet in the embodiment of FIG. 12.

FIG. 15b is a side elevational view of an L-hook for use in securing the inner flexible members in the embodiment of FIG. 12.

FIG. 16 is a perspective view of a quick-connect retaining hook for use in securing the inner flexible members in the embodiment of FIG. 12.

FIG. 17 is a perspective view of an alternate quick-connect retaining hook for use in securing the inner flexible members in the embodiment of FIG. 12.

FIG. 18 is a perspective view of another alternate quick-connect retaining hook for use in securing the inner flexible members in the embodiment of FIG. 12.

DETAILED DESCRIPTION OF THE PREFERRED EMBODIMENTS

Broadly, the present invention is directed to an apparatus which secures and restrains a tire or wheel of a vehicle in place. In particular, when used in combination with an automobile or truck, embodiments consistent with the present invention engage one or more wheels of the vehicle, and restrict movement of the restrained vehicle vis-a-vis the platform or bed of the truck trailer, train or ship (generally, a "transportation vehicle") moving the restrained vehicle. Embodiments consistent with the invention may be quickly put in place on a vehicle, and are operator friendly, lightweight and secure. Furthermore, the embodiments may be used on vehicles having minimal clearance between the tire and the fender or wheel skirt.

FIGS. 1–7

Figure 1:
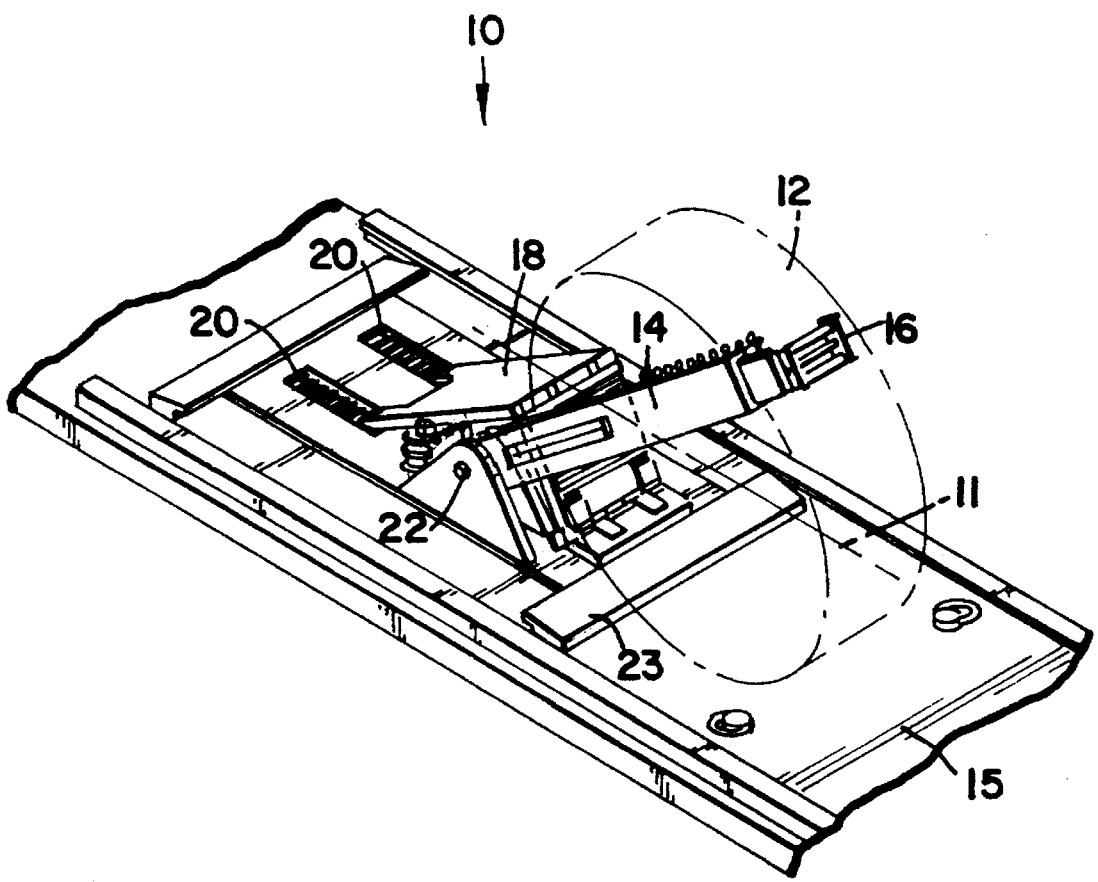
FIG. 1 is a perspective view of one embodiment of a wheel restraining apparatus consistent with the invention.

Turning to the Drawing, wherein like numbers denote like parts throughout the several views, FIG. 1 discloses a wheel restraining device 10 consistent with the present invention and engaging a wheel 12 (shown in phantom). Device 10 has an extendable arm 14, a wheel contact element 16 and a wheel chock 18. The wheel 12, rests on a saddle 23, with the whole device being on a platform 15. The extendable arm 14 extends to various lengths depending on the diameter of the wheel 12. Wheel contact element 16, actually engages a portion of the outer perimeter of wheel 12, preventing movement of the wheel backward or away from apparatus 10. Upon engagement of wheel contact element 16, wheel chock 18 is pushed upward, until it engages wheel 12. A set of gears or stepped configuration shown as 20, (which can be cut or inlaid into platform 15) allow wheel chock 18 to be set at different distances, which would vary as to the diameter of the wheel. Preferably, the depth of the stepped configurations is equal or greater than ⅜ inch. This depth provides stability to the chock 18. Extendable arm 14 pivots in a direction around pivot axis 22. This is shown more clearly in FIG. 2.

Figure 2:
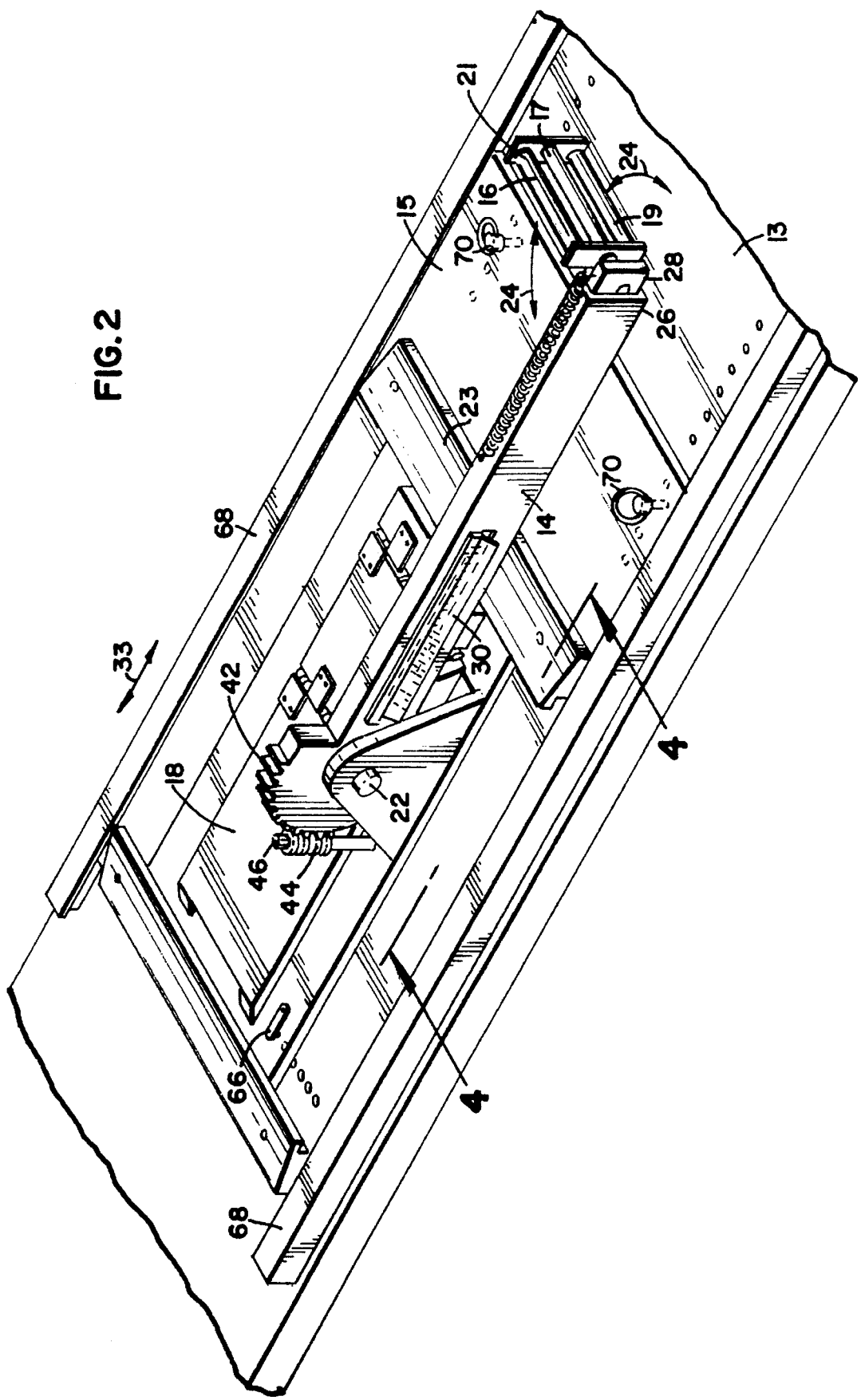
FIG. 2 depicts the apparatus of FIG. 1, with the apparatus at rest and no tire present.

FIG. 2 discloses an embodiment of the present invention, before a vehicle is loaded. As can be seen, arm 14 is at a resting position. Wheel contact element 16 may be hinged, in that it may be advantageous to be able to flip contact element 16 out of the way, shown in the direction of arrows 24, such that when a vehicle is driven on the platform 15, it does not contact wheel contact element 16. Alternatively, contact element 16 is configured such that a vehicle may drive over it, when positioning the vehicle in place. This is described in greater detail below.

The extendable arm 14 preferably has a female component 26 and a male component 28. This provides the ability of the arm to be extended at various lengths. Member 28 may be pulled out of member 26 by first opening hinge door 30, with the hinge door 30 having a first set of rack gears which engage a second set of rack gears on member 28. Thus, it is envisioned that door 30 may be opened and member 28 may be pulled out or pushed inward, to a desired length, and thereafter door 30 is closed. The rack gears on door 30 thereafter mesh with the rack gears located on member 28, thus limiting the movement of member 28. Additionally, some sort of the lock mechanism means may be employed on door 30 to ensure that it does not spring open inadvertently. In the preferred embodiment, the lock mechanism employs two clevis pins (not shown) inserted into each end of the door 30 to hold it in place during transport.

The tire contact element 16 is designed to provide surface contact to the upper portion of the tire in such a manner to secure the tire and also not wear or damage the tire surface during transport. Preferably, tire contact element 16 comprises a center unit 17 which allows for a 360° rotation. As shown in FIG. 2, center unit 17 is a fixed rod. Further, element 16 includes two rollers 19 and 21. Element 16 is similar in appearance to a bicycle pedal, which is rotatable for the whole element 16. The individual rollers 19 and 21 are also rotatable. The purpose of the rotatability of the device is to address the need to have the device lie flat on the floor when in resting position, because in the event that it cannot be flipped in the direction of 24 or 26, it must lie flat on the floor when the vehicle is driven off or on the platform.

Figure 3:
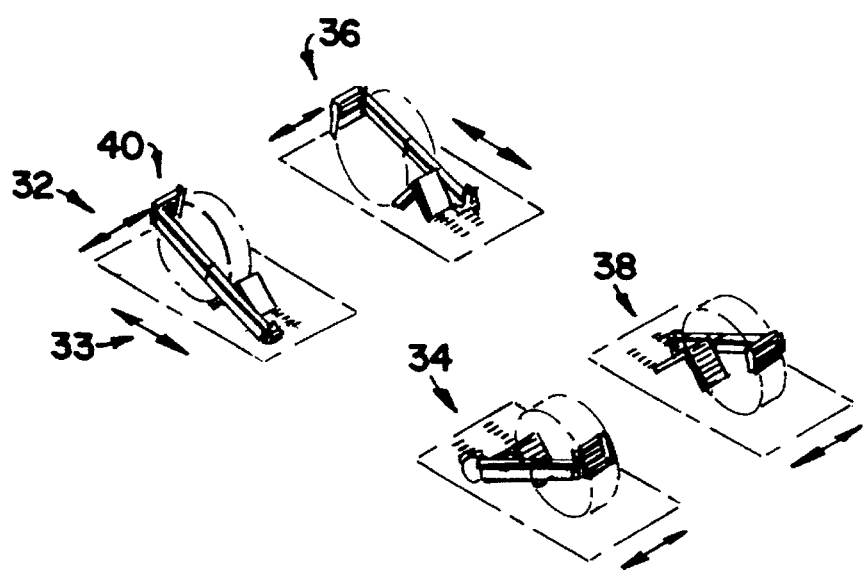
FIG. 3 discloses the apparatus of FIGS. 1 and 2, in use for a four wheel vehicle.

In a four wheel vehicle, the present invention is employed as shown in FIG. 3. To account for a different dimension of cars, it is envisioned the platforms may move in the direction of arrows 32 and 33 such that all cars may be accommodated. As can be seen from FIG. 3, 34 and 36 are identical, and 38 and 40 are identical. The device shown in FIGS. 1 and 2 is the same as the device shown as 34 and 36 in FIG. 3. 38 and 40 merely have the extendable arm and wheel chock reversed. Thus, to use the present device to secure a four wheel vehicle, a "left hand" and "right hand" version needs to be employed in the preferred embodiment.

As can be seen in FIGS. 1 and 2, the present invention is adapted with a thin arm 14 which may pass between a tire and a fender skirt 11, which is shown in phantom on FIG. 1. This is critical in that many new models of cars employ a skirt or fender of some type that partially hides the tire. With the pivot axis 22, and arm 14 moving in a plane which is 90° offset from pivot axis 22, the present invention may be used with cars employing such fender skirts. After the car is driven onto platform 15, arm 14 may be raised, clearing the space between the tire 12 and the fender skirt 11, and tire contact element 16 may be engaged against the tire 12. Arm 14 may be configured in a fashion to accommodate all vehicles.

Figure 4:
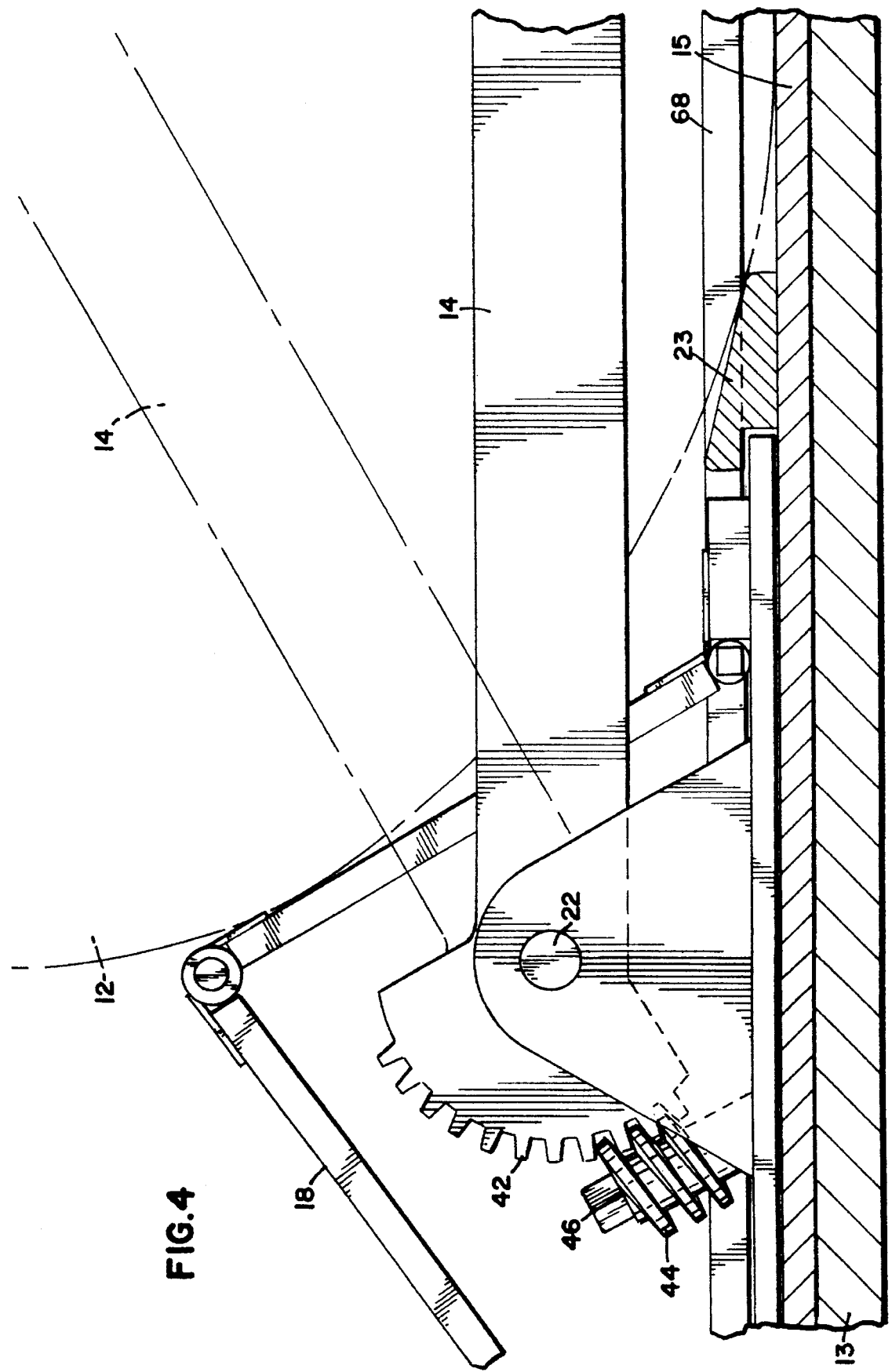
FIG. 4 is a close-up view of the arm and gear relationship of the embodiment of FIGS. 1–3.

FIG. 4 shows a close-up of the arm and gear configuration of the preferred embodiment shown in FIGS. 1–3. As is shown in FIG. 4, a helical gear 42 and worm gear 44 intermesh, which raises or lowers arm 14. Worm gear 44 may be rotated through the use of a motor, or some type of wrench may engage top portion 46 of worm gear 44, and rotated in a manner to raise or lower arm 14 to the desired height. Thereafter, wheel chock 18 is engaged against tire 12.

Wheel chock 18 and extendable arm 14 are mounted on a moveable platform 15 which is securely fastened to a bed of a highway transport trailer or floor (shown as 13 in FIG. 2) of other transport vehicles, such as rail cars, ships and airplanes. The wheel restraining device attaches to each wheel on each of the corners of each vehicle being transported as shown in FIG. 3.

Figure 5:
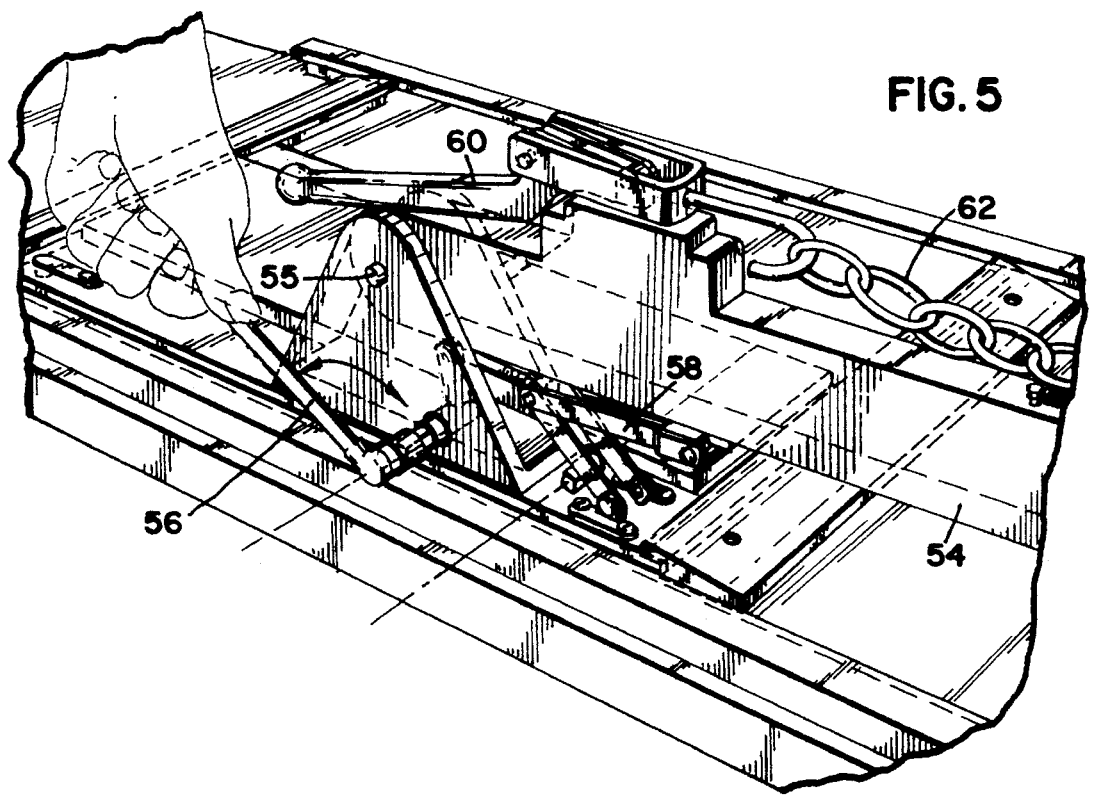
FIG. 5 is a perspective view of an alternative embodiment consistent with the present invention.
Figure 7:
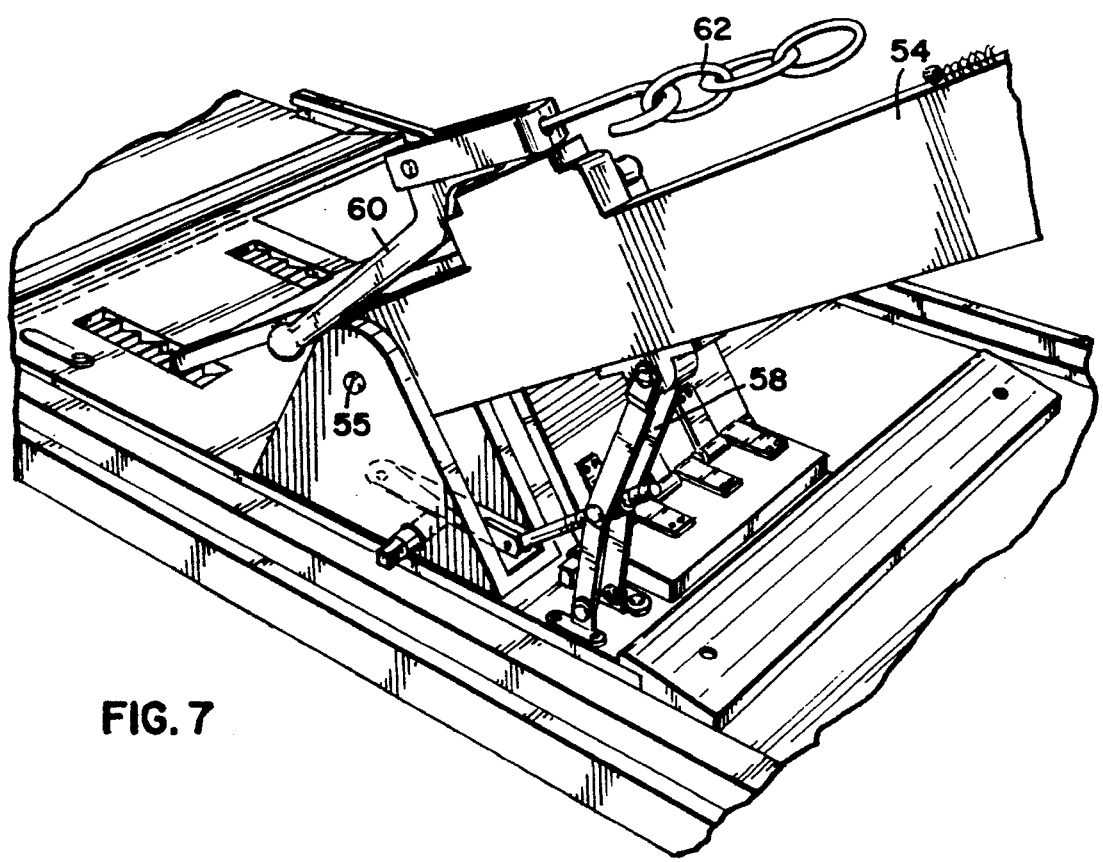
FIG. 7 is another perspective view of the embodiment of FIG. 5.
Figure 6:
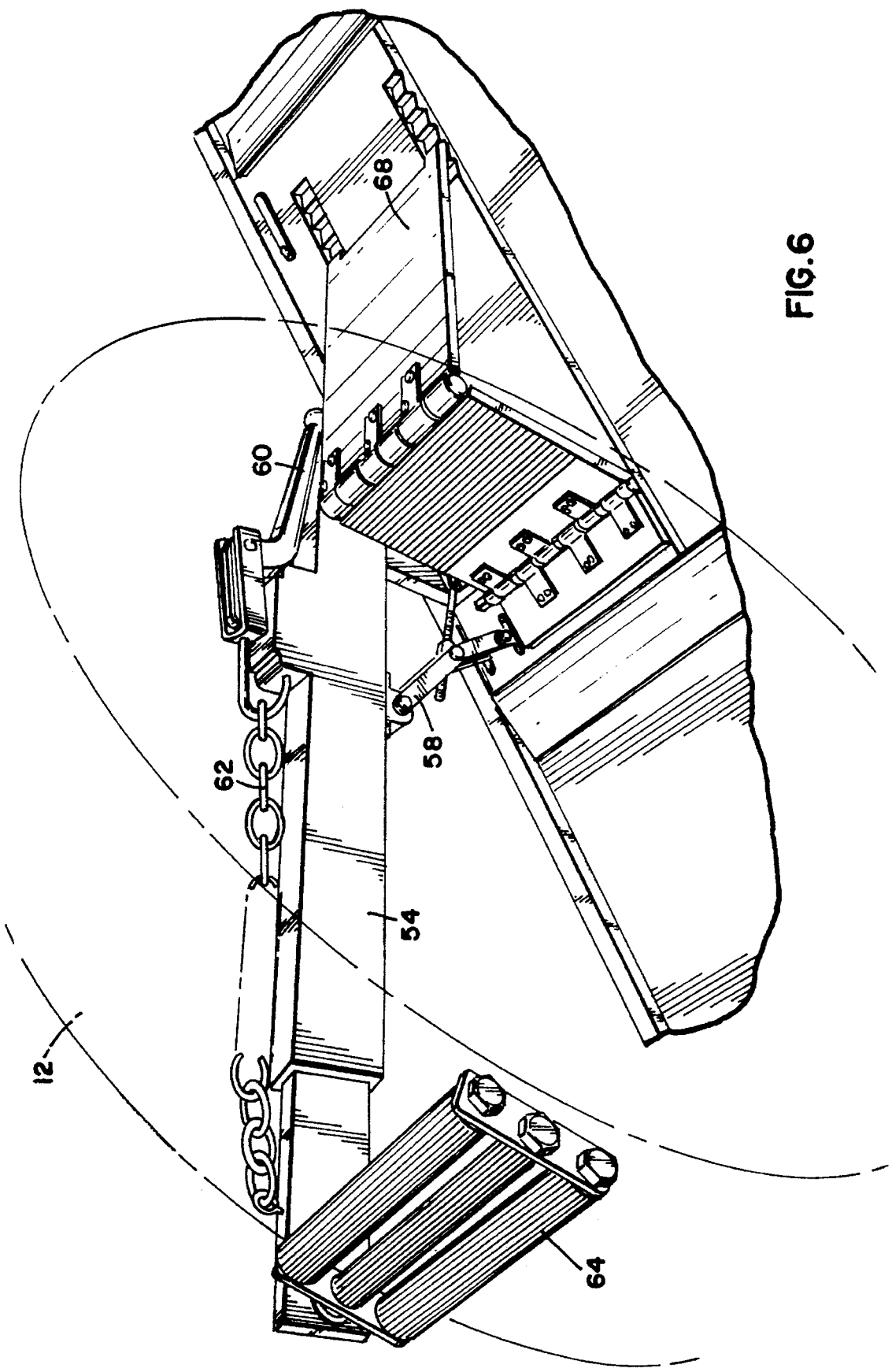
FIG. 6 is a perspective view of the embodiment of FIG. 5, shown with a wheel in place.

FIGS. 5, 6 and 7 show an alternative embodiment of the present invention. As can be seen in FIG. 6, rather than the use of a helical and worm gear, a clamp 60, chain 62 and hinging mechanism 58 operate to raise arm 54, which is akin to arm 14, through the use of wrench 56 which rotates a gear connected to hinge mechanism 58 which raises and lowers arm 54. Arm 54 has a pivot axis, which is 90° offset from the plane of the direction of travel of arm 54. As can be seen in FIG. 6, when 54 is raised to the proper height, clamp 60 connected to chain 62, is tightened, thus compressing wheel contact element 64 against tire 12. Thereafter chock element 68 is pressed against wheel 12. These are just two embodiments, which have the common purpose of having an extendable arm, which operates in a plane which is 90° offset from the pivot axis of the arm, thereby allowing the arm to engage the tire between a fender skirt and the tire.

Each wheel of the transported vehicle to be secured shall have available a small platform that the vehicle wheel shall be driven onto. The individual wheel platform shall be adjustable for the proper position so that the various wheel base lengths may be accommodated. Preferably, the small platform shall have a saddle (23 in FIG. 1) in which the wheel comes to rest. The saddle provides the proper position for the wheel to be able to accept the chock and the hold down clamp. When the wheels are in the position in the saddles, the vehicle is then considered to be parked, ready to be clamped down and chocked. The operator will therefore proceed to secure the vehicle.

Referring to FIG. 2, on each platform is a secondary platform 15 which provides the base for the chock 18 and the extendable arm 14. The secondary platform is designed to move in a sideways motion (in the direction of the pivot axis 22 and arrows 32) to bring the restraining device adjacent the wheel 12. The sideways movement is necessary to allow for various wheel widths, but is primarily directed to allow the driver, when loading the vehicle onto the transport platform, to not have to drive in an exact line when loading the vehicle. In other words, it allows the driver to partially miss the mark, and still have the present device perform. The secondary platform 15 may be adjusted in the direction of arrow 32 through the use of any type of securing means. In the preferred embodiment shown in FIG. 2, it is envisioned that a spring loaded pin 66 would be raised, which frees the secondary platform to be moved sideways and in the vicinity of the side of the tire. Thereafter, the pin 66 is released and put in a down position, extending down into a receptor in the primary platform. Thus, the secondary platform is prohibited from sideways movement. Upward movement of the secondary platform 15 is prevented by an upper movement means. In the preferred embodiment, the upper movement means includes two slots or tracks 68, which allow movement of the secondary platform 15 forward and backward with respect to the first platform 13, but does not allow the secondary platform 15 to be moved upwardly. The platform 15 may also be moved in the direction of arrow 33, to adjust for different wheel bases, as shown in FIG. 2. To move platform 15 in a "north" and "south" direction, spring loaded pin 70 is lifted, with platform 15 sliding in the direction of arrows 33, to a resulting position which aligns the arm correctly with the wheel. Obviously, any securing means other than a pin is envisioned.

The chock 18 and the extendable arm 14 are in a lowered position when the vehicle is driven onto the transport vehicle and driven off the transport vehicle. When the transported vehicle is in place, with the four wheels each resting in their respective saddles, the vehicle is considered to be parked and ready to be secured. The operator proceeds to secure each wheel separately. In the preferred embodiment, the operator first raises the pin which is holding the secondary platform from moving sideways. The operator thereafter manually slides the secondary platform in the vicinity of the side of the tire. When the secondary platform is in an appropriate position, the operator releases the securing pin, thus securing the secondary platform from sideways movement.

The next action is to raise the extendable arm. The raising and lowering of the extendable arm is done through the use of a helical gear and a worm gear located on the extendable arm and secondary platform respectively. As the worm gear is rotated, it moves the helical gear and causes movement of the extendable arm upward or downward as desired. In the event that the arm is being raised, it shall be raised to a proper position to hold the wheel. Typically, this is at a point of approximately 2:00 o'clock on the tire. The wheel contact element 16, contacts a first half of the tire, which, when viewing FIG. 1 is any point between the 12:00 o'clock and the 6:00 o'clock position on the tire. The wheel chock which is 18, contacts the tire on the second half of the tire, which is between the 6:00 o'clock position and the 12:00 o'clock position.

In securing the arm, when the extendable arm is raised to its desired level, it is ready to have its length secured. Securing of the length of the hold down clamp arm is described above. After the extendable arm is secured against the tire, the next action is to raise the chock on the opposite side of the tire. The raising of the chock is done by bringing the chock into contact with the tire. This can be done, through a variety of means, whether manually, or some sort of mechanical method which moves the chock into contact with the tire. Enough pressure is supplied by the chock against the tire to give adequate compression to the tire between the opposing contact devices, that is the extendable arm of the first half of the tire and chock portion on the second half of the tire. Compression may also be applied to the tire by employing a threaded rod/nut system on the arm, which could be tightened, pulling the arm against the tire, after the arm is secured. As the chock is raised into position, its outer end is dragged into its position, and when the compressions limit is reached, the chock is stopped, and the chock will then be held in a proper position by the stepped configurations, which are located on the floor of the secondary platform. The chock is thereafter secured in place, with a securing means such as a hold down hook. A hold down hook or other securing means known in the art is used to assure that the chock would not be jiggled out of the stepped configurations during transport. Each of the securing wheels is secured in the same manner. It is estimated that it will take approximately 30 seconds to secure each wheel.

The unsecuring of each wheel is generally the reverse action with one exception. To unsecure the lower end of the chock, after releasing its securing means, such as a hold down hook, the operator compresses the chock enough to release it from the stepped configuration or catch teeth and then holds the lower end of the chock up by hand to allow the chock to be free of the teeth while the operator then allows the chock to extend out until it is laying flat on the floor of the secondary platform. The reverse sequence is continued until the chock is down and the extendable arm is down and resting on the floor, and the wheel is unsecured and the secondary platform is moved sideways, away from the vicinity of the tire. This unsecuring action takes approximately 30 seconds for each tire. When all the wheels are unsecured, the vehicle is thereafter unsecured, and ready to be backed out and moved out of the transport vehicle.

In the preferred embodiment, it is not necessary to have each of the platforms moveable in the north, south direction. As is shown in FIG. 3, only the rear devices 40 and 36 need to be moveable in the north, south direction. The front platforms 34 and 38 may be bolted in position and need not be moved forward or backward. However, the ability of the secondary platform, moving in a sideways direction, should be present in all four devices if the device is to be adjustable. For the platforms of 40 and 36, there will be a retaining means, in the shape of an upside down "L" on each side of the transporting vehicle track which will have as its primary purpose being the prevention of the platform from moving upward.

FIGS. 8–11

Figure 8:
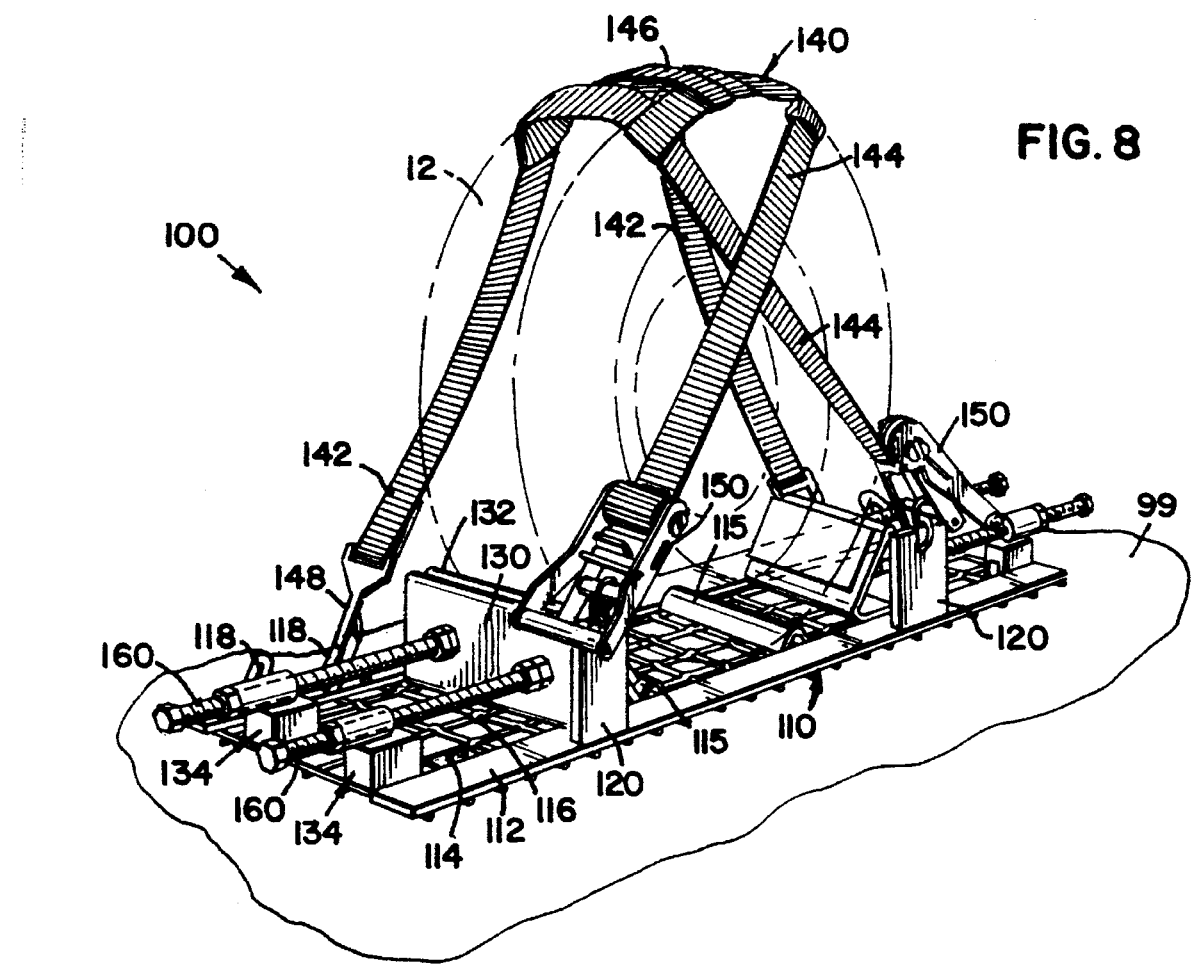
FIG. 8 is a perspective view of an additional embodiment consistent with the invention, shown with a wheel in place.

Another embodiment consistent with the invention is shown in FIGS. 8 and 9 as wheel restraint device 100 shown restraining vehicle wheel 12. Device 100 includes a platform 110, wheel chocks 130, wheel chock adjustment mechanisms 134, restraining member 140 and ratchets 150.

Wheel 12 is supported on platform 110, which is secured to the support surface 99 of a transportation vehicle such as a truck trailer, ship or train car through bolt assemblies 114. Preferably, four bolt assemblies 114 are used, one proximate each corner of platform 110. The design of each bolt assembly will vary depending upon the configuration of support surface 99. For example, for a mesh support surface, bolt assembly 114 may include a suitably sized J-bolt secured to platform 110 with a nut.

Platform 110 preferably includes a pair of generally parallel strips 112 mounted to a grid 116. Grid 116 includes two sets of mutually orthogonal arrangements of steel rods secured to one another at their intersection points. Supports for restraining member 140 are mounted to strips 112. In addition, a pair of generally arcuate strips 115 extend transverse to strips 112 to assist an operator of the wheeled vehicle in determining a centered position of wheel 12 on device 100. In the alternative, platform 110 may have different constructions, such as being formed of a single plate; however, it has been found that grid 116 provides sufficient structural support with a significant reduction of weight over other constructions.

Platform 110 is preferably constructed of structural steel and the preferred manner of attaching the components in platform 110 is welding. Other structural materials and attachment methods may be used in the alternative.

A first point of abutment for wheel 12 is through wheel chocks 130, which are used to restrict the rotation of the wheel. Each wheel chock 130 is preferably a steel pipe bent into a three sided wedge with a right triangle cross-section. A surface which abuts wheel 12 preferably includes a rubber pad 132 which conforms to the surface of wheel 12 and prevents any marring of the wheel. Other known designs and materials may be used in the alternative for wheel chocks 130.

Preferably a pair of wheel chocks are used to restrict the rotation of wheel 12 in both directions. However, it will be appreciated that only one wheel chock may also be used. For example, different wheel restraint devices may have wheel chocks on different ends of their respective vehicle wheels to prevent rotation of a vehicle in both directions.

Wheel chocks 130 are preferably secured to platform 110 through wheel chock adjustment mechanisms 134. Each wheel chock 130 is preferably secured through two of mechanisms 134; however, it will be appreciated that each may be secured by one adjustment mechanism, or alternatively by three or more adjustment mechanisms.

Each adjustment mechanism includes a fixed member 136 which is removably secured at a fixed position to platform 110 through an L-shaped flange 137 which engages one of the transverse steel rods in grid 116. An elongated threaded nut 138 is mounted to fixed member 136.

A threaded bolt or member 160 threadably engages nut 138. One end of bolt 160 projects through an aperture in wheel chock 130. The head 161 of bolt 160, in cooperation with a pair of nuts 162*a* and 162*b* locked at a fixed position on bolt 160, enables bolt 160 to freely rotate about its longitudinal axis with respect to wheel chock 130.

At the other end of bolt 160, a second nut 164 is welded to bolt 160 and is used to actuate adjustment mechanism 134. A lock nut 163 is also threaded on threaded bolt 160 interposed between nut 164 and elongated nut 138 and is used to lock adjustment mechanism 134. Other components, such as washers or bearings, may also be used.

By rotating nut 164, bolt 160 will thread through nut 138 on fixed member 136, thereby varying the distance between fixed member 136 and wheel chock 130. With fixed member 136 fixed on platform 110, wheel chock 130 will thus move closer to or farther away from wheel 12 along the length of platform 110.

Adjustment mechanisms 134 and wheel chocks 130 are preferably removable from platform 110. This enables a vehicle wheel to be driven onto platform 110 without encountering any obstructions. Alternatively, low profile portions of mechanisms 134 may be permanently secured to platform 110 in the alternative. For example, bolts 160 may be permanently secured to platform 110, for example at strips 115. These bolts may then project through apertures in wheel chock 130 and be secured thereto by nuts or wingnuts. Other known constructions for adjustment mechanisms 134 may also be used in the alternative.

Figure 10:
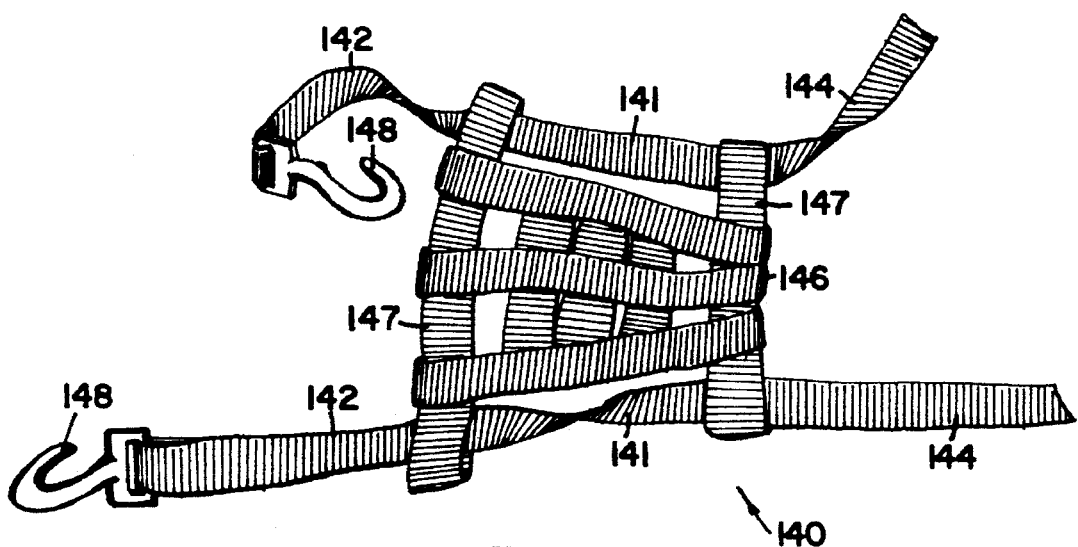
FIG. 10 is a top plan view of the restraining member of the embodiment of FIG. 8.

Wheel 12 is held down onto platform 110 by restraining member 140. As shown in FIG. 10, restraining member 140 includes a restraining web 146 slidably mounted on a pair of elongate straps 141. Restraining web 146 and straps 141 are preferably constructed of a flexible reinforced strapping material such as straps manufactured by Kynedine, although it will be appreciated that other materials and constructions may be used in the alternative.

Web 146 is preferably adapted for abutting the outer surface of wheel 12, and to this extent, is preferably flexible to conform to the contour of the wheel. However, web 146 may also be a rigid or padded member as well. In the preferred construction, web 146 includes a three by three grid of straps sewn together and to a pair of transverse straps 147. Straps 147 preferably include loops at each of their ends, for permitting straps 141 to slide therethrough and enable the position of web 146 to be freely adjusted. While sewing is a preferred manner of constructing web 146, other manufacturing techniques, including the use of adhesives, may also be used.

Each flexible strap 141 forms an inner flexible member 142 and an outer flexible member 144. Inner flexible member 142 preferably includes a clip 148, such as a Kynedine 1212 Twist Hook or other known clip, disposed at the end thereof. Clip 148 is preferably removably secured to a ring 118 welded or otherwise mounted to strip 112 on platform 110 on the inner side of the wheel, as shown in FIG. 8. More than one ring 118 may be provided on strip 112 for receiving clip 148, for example, to vary the connection point of restraining member 140 depending upon the size of wheel 12. Ring 118 is preferably a fixed member welded to strip 112, such as a half of a chain link or the end of a J-bolt. However, a pivotable member that lays down on strip 112 when not in use, such as a pivotable D-ring, may also be used in the alternative.

Outer flexible member 144 is preferably mounted to platform 110 on an outer side of wheel 12 through a tightening mechanism such as ratchet 150. Ratchet 150 is preferably a Kynedine 804 Ratchet, which includes a pivotable handle for incrementally tightening restraining member 140 by shortening the effective length of outer flexible member 144. Ratchet 150 also includes a release mechanism for releasing tension in flexible member 144. Other known tensioning or tightening mechanisms may be used in the alternative.

Figure 11:
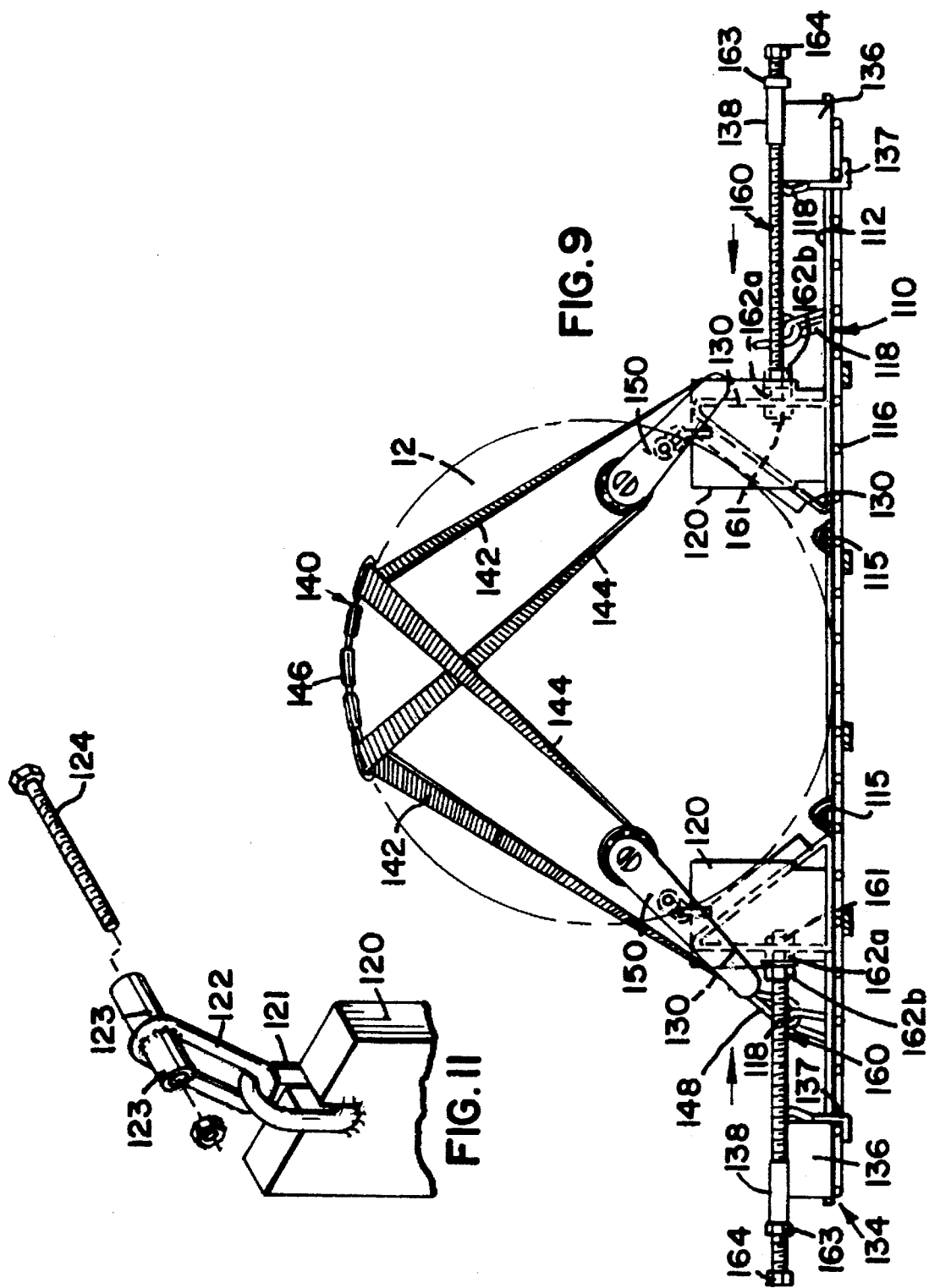
FIG. 11 is an enlarged fragmentary perspective view of the standup and universal joint of the embodiment of FIG. 8.

Ratchet 150 is preferably mounted to platform 110 through a universal joint disposed on a fixed stand up 120. Stand up 120 is bolted or welded to strip 112 on the outer side of wheel 12. As shown in FIG. 11, the universal joint is preferably formed of a first chain link 121 welded into a groove in stand up 120, and a second chain link 122 chained to first chain link 121. The groove is generally oriented within +/−10 degrees, preferably about +/−5 degrees, offset from an axis transverse to the longitudinal axis of platform 110. A pair of sleeves 123 are welded to opposing sides of second chain link 122, and ratchet 150 is secured thereto through a bolt and nut assembly 124 extending through apertures in ratchet 150 and through sleeves 123 and second chain link 122.

Through the chained connection between links 121 and 122, ratchet 150 is permitted to freely rotate with limited motion through several axes relative to stand up 120, thereby enabling ratchet 150 to adjust for different sizes of wheels, as well as to lay down and out of the way of wheel 12 when not in use. Other universal joint constructions, such as a pair of sleeves welded to one another at an offset angle, and pivotably mounted respectively to stand up 120 and ratchet 150, may be used.

Returning to FIGS. 8 and 9, in the preferred construction, a pair of inner flexible members 142 and a pair of outer flexible members 144 are secured to platform 110, respectively, through a pair of clips 148 and a pair of ratchets 150. However, it will be appreciated that one inner flexible member or one outer flexible member may be used in the alternative. In addition, outer flexible members 144 preferably cross as shown in FIG. 8, while inner flexible members 142 do not cross. Alternatively, it will be appreciated that inner flexible members 142 may cross, or that outer flexible members 144 may not cross. In addition, it will be appreciated that ratchets 150 may be used to secure inner flexible members 142, and that clips 148 may be used to secure outer flexible members 144.

Wheel restraint device 100 may be constructed to be symmetrical along its length, whereby the same design of device 100 may be used to secure all wheels of a wheeled vehicle. Alternatively, separate left and right side designs may also be constructed.

Four of devices 100 may be used to hold down a four wheeled vehicle. Alternatively, only two may be used, at opposing ends and sides of the vehicle (e.g., one on the front driver side wheel, and the other on the rear passenger side wheel). In addition, as few as one device 100 may be used in less severe applications.

In operation, one or more of devices 100 are mounted to the supporting surface 99 of a transportation vehicle through assemblies 114. The positions of each device will vary depending upon the wheel base length and the width of the vehicle to be secured with devices 100. Next, the vehicle is loaded onto the transportation vehicle so that the wheels thereof are centered on each platform 100 (i.e., between strips 115). Each restraining member 140 is then wrapped over the top of its respective wheel and the inner flexible members 142 thereof are clipped through clips 148 to rings 118 on platform 110. Next, ratchets 150 are actuated to incrementally shorten outer flexible members 144 and tighten member 140 to securely hold down wheel 12.

Once restraining member 140 is secured to platform 110, wheel chocks 130 are placed in position by latching fixed members 136 of adjustment mechanisms 134 to platform 110 by engaging the respective flanges 137 on transverse rods in grid 116. Wheel chocks 130 are then forced against wheel 12 by rotating bolts 160, preferably through the use of a power driver such as an electrical or air pressure driven power torque wrench or drill. Alternatively, any number of manually operated devices, such as wrenches, torque wrenches, or ratchet-driven sockets, may be used. Bolts 160 may then be locked in position by tightening lock nuts 163, preferably with a hand wrench.

Removal of devices 100 is generally the reverse of the installation. Lock nuts 163 are loosened, and bolts 160 are rotated in an opposite direction, to withdraw wheel chocks 130 from engagement with wheel 12. Wheel chocks 130 and adjustment mechanisms 134 may then be removed from platform 110. Next, ratchets 150 are released by actuating their respective release mechanisms, and inner flexible members 142 are unclipped from platform 110. Restraining member 140 may then be removed from wheel 12 such that member 140 and ratchets 150 are out of the way of the wheeled vehicle. The wheeled vehicle is now able to be driven off of supporting surface 99.

FIGS. 12–17

Figure 12:
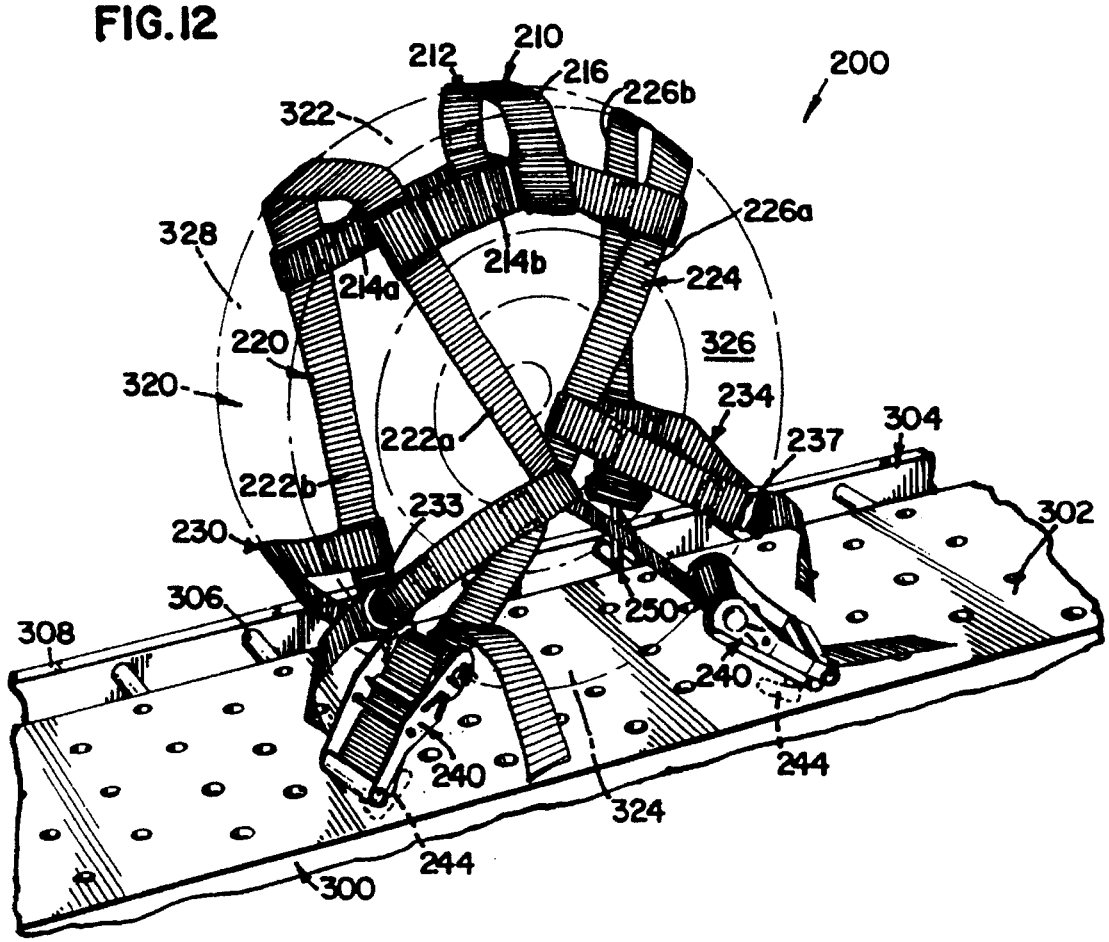
FIG. 12 is a perspective view of an additional embodiment consistent with the invention, shown with a wheel in place in phantom.

Another embodiment consistent with the invention is shown in FIG. 12 as wheel restraint device 200 which restrains vehicle wheel 320 on a support surface 300. Device 200 generally includes a restraining member 210 which is secured to support surface 300 by a plurality of securing mechanisms 240 and 250.

Figure 13A:
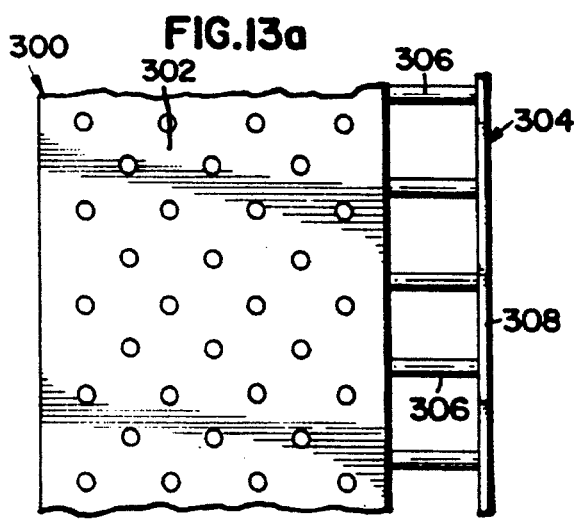
FIG. 13a is a partial top plan view of the support surface on a conventional car carrier trailer.

Support surface 300, as shown in FIG. 13a, is representative of the typical structure found on a standard over-the-road multiple car carrier trailer. Support surface 300 generally includes a perforated plate 302 on which the vehicle wheels are supported. The perforations in the plate are generally spaced in an array and separated by 2¼ inches between centers. A tie down rail assembly 304 generally runs along the inside of the support surface and is used for securing chains to the underside of a vehicle in a conventional chain-based vehicle restraint configuration. Generally, assembly 304 includes several "rungs" 306 extending inward therefrom, and an outer rail 308 running along the support surface generally at a right angle to the rungs. Tie down rail assembly 304 generally runs most of the length of support surface 300 on a conventional trailer, except for an area proximate the retractable ramps, where no tie down rail assembly is found.

An alternate, proposed, design for a trailer support surface is shown as support surface 300', which uses an alternate tie down rail assembly 309 having a plurality of u-shaped flanges 310 and an outer rail 312. Assembly 309 is similar to conventional tie downs used on flat-bed trailers for securing cargo such as lumber.

Turning to FIG. 14, restraining member 210 is similar in design to restraining member 140 of FIG. 10, having a restraining web 212 (an "upper restraint") slidably mounted on a pair of elongate straps 220 and 224. Upper restraint 212 includes a pair of flexible members 214a and 214b which are joined by a transversely extending flexible member 216, and which include loops formed at each end thereof to slidably retain straps 220 and 224. In operation, upper restraint 212 is supported on an upper outer surface 322 on wheel 320 and is used to properly position straps 220 and 224 to provide the primary restraining force for holding wheel 320 down on support surface 300.

Upper restraint 212 is preferably centered at the top of wheel 320, although it may be located generally anywhere along the upper half of the outer surface of vehicle wheel 320 to properly orient the flexible straps to provide a hold down force with a component which extends normal to support surface 300. Moreover, while upper restraint 212 is shown as a web of flexible straps, many alternative designs, e.g., rigid or padded designs, are also contemplated.

Further, while upper restraint 212 is shown slidably mounted to straps 220 and 224 such that the straps provide the primary hold down force for restraining a wheel, the upper restraint may alternatively be fixedly mounted to the straps and/or may operate in conjunction with the straps to provide the hold down force for restraining a wheel (e.g., if separate inner and outer flexible straps were fixed to the upper restraint). Further, the upper restraint may comprise a portion of one of the straps (e.g., where only one strap, forming an inner and an outer flexible member, is used). However, it is preferable in multiple-strap embodiments to include some mechanism in the upper restraint to engage all of the straps such that all of the straps are properly positioned on the wheel by the upper restraint.

Strap 220 forms a first outer flexible member 222a and a first inner flexible member 222b, and strap 224 forms a second outer flexible member 226a and a second inner flexible member 226b. In operation, outer flexible members 222a and 226a extend along an outer side 326 of wheel 320, and inner flexible members 222b and 226b extend along an inner side 328 of wheel 320. Also, as shown in FIG. 12, outer flexible members 222a and 226a preferably cross one another, while inner flexible members 222b and 226b do not cross. The inner and outer flexible members may alternatively be formed from separate straps.

A pair of lower restraints 230 and 234 are joined to straps 220 and 224, respectively. First lower restraint 230 includes a pair of members 232a and 232b which are respectively secured to outer flexible member 222a and inner flexible member 222b. Preferably, member 232a includes a loop at its end to provide an adjustable sliding arrangement over outer flexible member 222a, while member 232b is fixed to inner flexible member 222b. Members 232a and 232b are adjustably secured to one another, preferably through a pair of O-rings or D-rings 233 affixed to member 232a and slidably engaging retaining member 232b, such that the effective length of lower restraint 230 may be varied by sliding member 232b through the rings. Similar to restraint 230, second lower restraint 234 includes a pair of members 236a and 236b respectively secured to outer flexible member 226a and inner flexible member 226b, and joined through O-rings or D-rings 237.

In operation, lower restraints 230 and 234 abut a lower outer surface 324 of wheel 320 to provide a supplemental restraining mechanism which resists any sliding or rotation of wheel 320. Consequently, restraints 230 and 234 operate in much the same manner as a "chock", thereby eliminating the need for any additional chocking mechanism. However, a supplemental chock may be used in the alternative. In addition, various alternative designs for restraints 230 and 234, such as fixed or padded members, may also be used.

Straps 222 and 226, upper restraint 212 and lower restraints 230 and 234 are preferably Kynedine straps (or equivalent) which are secured by means of sewing or adhesives. Other materials and constructions may be used in the alternative. It will also be appreciated that different numbers of inner flexible members, outer flexible members, upper restraints and lower restraints may be used.

Returning to FIG. 12, restraining member 210 is secured to support surface 300 by outer and inner securing mechanisms 240 and 250. A pair of outer securing mechanisms 240 preferably engage outer flexible members 222a and 226a. Securing mechanisms preferably include a tightening or adjustment mechanism such as ratchet 242, which is preferably a Kynedine 804 Ratchet or equivalent which varies the effective length of the outer flexible member to tighten the assembly. Other known tensioning or tightening mechanisms may be used in the alternative.

Ratchet 242 is preferably secured to support surface 300 with an L-hook 244 which is inserted through one of the perforations in support surface 300. In the alternative, the ratchets may be secured to other supporting structure, e.g., using any of the quick-connect hook designs discussed below or other coupling mechanisms. For example, with some double-wheel vehicles, the wheels may occupy the entire width of the supporting surface, thereby requiring the ratchets to be secured to alternate structure.

As shown in FIG. 15a, L-hook 244 includes an L-shaped rod 245 which is bent at an approximate right angle (e.g., between 80 and 85 degrees), and a bracket 246 which is preferably welded to rod 245 to extend generally orthogonal direction to both portions of the rod. Bracket 246 is preferably a sleeve which is adapted to receive a bolt or pin (not shown) to retain ratchet 242. In operation, L-hook 244 may be inserted past its bend into a perforation in support surface 300, so that the bar engages an underside surface of support surface 300. Some degree of rotation of the L-hook will be permitted in this configuration.

Inner flexible members 222b and 226b may also be secured to support surface 300 in a similar manner to the outer flexible members using an L-hook 260 such as shown in FIG. 15b. Similar to hook 240, L-hook 260 includes an L-shaped bar 264 welded or otherwise fastened to a bracket 262, which is adapted to receive a bolt for retaining the loop in the end of the inner flexible members (e.g., an L-hook 260 is shown secured to loop 227b of flexible member 226b in FIG. 14 as an illustration). However, it is preferable to orient bracket 262 to extend in generally the same direction as the lower portion of bar 264. L-hook 260 is primarily (but not necessarily) useful as an alternative to the various quick-connect hook designs (discussed below) in situations where no separate tie down rail assembly is found on support surface 300 (e.g., where retractable ramps are located).

Returning to FIG. 12, the more preferred manner of securing inner flexible members 222b and 226b to support surface 300 is by using a quick-connect hook (e.g., hook 250 shown attached to flexible member 222b in FIG. 14) which permits easy and quick connection and disconnection to support surface 300 when no tension is applied by the vehicle restraint device. Several preferred quick-connect hook designs are shown in FIGS. 16–18.

Hook 250 is shown in greater detail in FIG. 16. Hook 250 is characterized generally as a spring hook, as this embodiment includes a resilient retaining member 258 for retaining an object such as tie down rail assembly 304 when no tension is applied to the hook. Hook 250 includes a support member 252 having first and second ends 252a and 252b. A coupler 254 is disposed at first end 252a for securing the hook to one of the inner flexible members. In addition, a catch member 256 is disposed at second end 252b for providing the catching surface which engages the object to be retained when tension is applied to the coupler. Preferably, support member 252 and catch member 256 are formed as an integral J-shaped body; however, other shapes and designs may be used in the alternative.

A resilient retaining member 258, having a free end 258b, is coupled at a fixed end 258a (preferably by screwing the member onto a threaded bolt welded or otherwise mounted to first end 252a of support member 252) to extend toward catch member 256. Retaining member 258 is preferably a coiled spring which is bendable in a plurality of directions (i.e., omnidirectionally) from an unloaded, closed position, to an loaded, open position such phantom position 258'. Further, the free end of member 258 is preferably spaced a short distance from catch member 256. The preferred coil spring is a ½" diameter spring. Other omnidirectionally-bendable retaining members may be used in the alternative.

The use of an omnidirectional resilient retaining member offers a substantial advantage over conventional spring hooks, which typically include a leaf spring retaining member which is bendable or movable only in a single direction, in that it is substantially easier to bend the retaining member to engage an object. In the preferred wheel restraint application, this is important since the inner flexible members are hooked to the tie down rail assembly while a vehicle is oriented over the support surface. An operator will typically have to reach around the wheel and the surrounding structure to engage the rail assembly, and may not even be able to see the assembly during this step. The design of hook 250, however, facilitates engaging the rail assembly since the hook does not need to be oriented in a particular direction to connect or disconnect the hook from the rail assembly.

An alternate quick-connect hook 270 for securing the inner flexible members is shown in greater detail in FIG. 17. Hook 270 is characterized generally as a passive positive hook, as this embodiment includes an additional, oppositely-arcuate catch member 276 for maintaining the hook in a generally upright position when hook 270 is supported on an object such as tie down rail assembly 304 when no tension is applied to the hook. Hook 250 includes a support member 272 having first and second ends 272a and 272b. A coupler 271 is disposed at first end 272a for securing the hook to one of the inner flexible members. In addition, a first catch member 274 is disposed at second end 272b. Catch member 274 is upwardly arcuate (i.e., curving toward the coupler) for providing the catching surface which engages the object to be retained (e.g., the rung in position 306) when tension is applied to the coupler. Preferably, support member 272 and catch member 274 are formed as an integral body; however, other shapes and designs may be used in the alternative.

A second catch member 276 is disposed at the end of first catch member 274 distal from support member 272. Member 276 is downwardly arcuate (i.e., curving away from the coupler) and operates as a retaining mechanism for retaining the hook in a generally upright orientation when tension is not applied to the coupler (e.g., the rung in position 306').

In operation, the configuration of hook 270 permits the hook to be rested on an object such as a rung on tie down rail assembly 304 (e.g., as shown in FIG. 17 where second catch member 276 engages the rung in position 306'). Preferably, hook 270 is balanced such that it remains in a generally upright position on a rung absent tension to coupler 271, which will generally occur if the center of gravity of the hook is located anywhere between the first and second catch members, or if a portion of the hook contacts the object to be retained to restrict rotation of the hook. Then, when tension is applied to coupler 271 (e.g., by tightening an inner flexible member), the rung will slide downward relative to the hook to engage first catch member 274 (e.g., to the position 306 of the rung shown in FIG. 17). In wheel restraint applications, this is particularly beneficial since the hooks for the inner flexible members may be engaged on rail assembly 304 before the wheel restraint is tightened, without falling through between the rungs, and without requiring any further attention during the other installation steps.

Figure 13B:
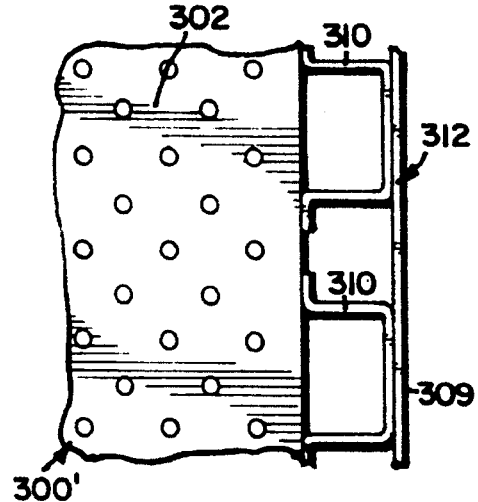
FIG. 13b is an enlarged partial top plan view of an alternate support surface design which may be used on a transportation vehicle.

FIG. 18 shows an alternate passive positive hook 280 which operates substantially in the same manner as hook 270 of FIG. 17. A support member 282 includes first and second ends 282a and 282b. A coupler 281 is joined to first end 282a, and a first, upwardly arcuate catch member 284 is joined to second end 282b to retain an object under tension (e.g., the rung in position 306). Moreover, a second, downwardly catch member 286 is affixed to support member 282 extending generally toward first catch member 284, and operates in substantially the same manner as catch member 276 on hook 270 to retain an object when no tension is applied to the hook (e.g., the rung in position 306'). Hook 280 is particularly well suited for engaging the tie down rail assembly 309 (e.g., along rail 312) on the alternate support surface 300' in FIG. 13b, although the hook may also be used with support surface 300.

Hooks 250, 270 and 280 may be used in applications (other than restraining wheels) where it may be desirable to temporarily retain or balance a hook on a retained object temporarily before tension is applied to the hook coupler, so that tightening of the hook may be performed without having to attend to the hook itself. Moreover, different couplers may be used on the hooks to affix the hook to different structures, and the hooks may be designed to retain different objects. Other modifications to the hooks may be made consistent with the invention.

Returning to FIG. 12, wheel restraint device 200 is preferably installed by first placing restraining member 210 over wheel 320 with upper restraint 212 resting upon the upper outer surface 322 of the wheel. Then, inner flexible members 222b and 226b are connected to support surface 300 using hooks 250 (or alternatively hooks 260, 270 or 280), and outer flexible members 222a and 226a are connected to support surface 300 by installing L-hooks 244 within perforations in plate 302, with the outer flexible members crossing one another. At this point, the effective lengths of lower restraints 230 and 234 may be adjusted if necessary. Next, ratchets 242 are activated to shorten the effective length of the outer flexible members. By shortening the outer flexible members, straps 220 and 224 pull downward to hold down wheel 320, and lower restraints 230 and 234 are pulled taut to "chock" wheel 230 by resisting its rotation or sliding. Due to the design of the retaining hooks for the inner flexible members, the hooks will remain engaged to the support surface while performing the latter installation steps.

Removal of device 200 is generally the reverse of installation. First, ratchets 242 are released. Then, the outer flexible members and inner flexible members are detached from the support surface, permitting the device to be removed from the wheel.

Wheel restraint device 200 offers several advantages over conventional designs. Installation of the device is quick and easy, and can be performed by an operator without requiring the operator to crawl under the vehicle. In addition, the device securely holds down the wheel, rather than the frame, of a vehicle, offering greater stability than conventional chain restraints. Device 200 is also readily adaptable to be used with just about any make and model of vehicle, regardless of design.

Further, device 200 is extremely lightweight. Each device 200 may have a total weight of about 12 pounds or less per wheel. With two devices 200 securing each vehicle, the total added weight to a transporting vehicle is only 24 pounds or less. Conventional chain restraints weigh significantly more than device 200, and it is believed that replacing conventional chain restraints with devices 200 may provide 2000 pounds or more of weight savings on a standard car carrier trailer, thereby providing significant cost savings in terms of initial trailer costs and operating fuel costs.

Various modifications may be made to the preferred device 200 consistent with the invention. For example, many of the modifications discussed above with respect to the other preferred embodiments also apply to device 200.

It is to be understood that even though numerous characteristics and advantages of the present invention have been set forth in the foregoing description, together with details and several preferred apparatus used to practice the present invention, the disclosure is illustrative only, and changes may be made in details, especially in matters of details which fall within the principles of the invention to the full extent indicated by the broad general meanings of the terms to which the appended claims are expressed.

What is claimed:

1. A device for restraining a wheel on a vehicle to a support surface on which the wheel is supported, the device comprising:
 (a) a restraining member, comprising:
  (i) an upper restraint supported on a upper outer surface of the wheel;
  (ii) inner and outer flexible members coupled to and extending from the upper restraint on inner and outer sides of the wheel, respectively; and
  (iii) a lower restraint including a flexible member coupled to the inner and outer flexible members and abutting a lower outer surface of the wheel; and
 (b) inner and outer securing means for respectively securing the inner and outer flexible members to the support surface.

2. The device of claim 1, further comprising:

(a) second inner and outer flexible members coupled to and extending from the upper restraint on inner and outer sides of the wheel, respectively;

(b) second inner and outer securing means for respectively securing the second inner and outer flexible members to the support surface; and (c) a second lower restraint including a flexible member coupled to the second inner and outer flexible members and abutting a lower outer surface of the wheel opposite the first lower restraint.

3. The device of claim 2, wherein the first and second outer flexible members cross.

4. The device of claim 1, wherein the inner and outer flexible members are formed as an integral strap, wherein the upper restraint includes a web of flexible material slidably coupled to the inner and outer flexible members, and wherein the flexible members and the web are formed from flexible strapping material.

5. The device of claim 1, wherein the lower restraint comprises first and second straps buckled together to adjust the effective length of the lower restraint.

6. The device of claim 1, wherein the outer securing means includes adjustment means for adjusting tension in the outer flexible member.

7. The device of claim 6, wherein the adjustment means includes a ratchet for varying the effective length of the outer flexible member.

8. The device of claim 7, wherein the support surface is of the type including a perforated plate with an array of perforations formed thereon, and wherein the outer securing means further includes an L-hook coupled to the ratchet, the L-hook including an L-shaped bar inserted into a perforation on the perforated plate and retained against an underside of the perforated plate.

9. The device of claim 8, wherein the inner securing means includes an L-hook coupled to the inner flexible member, the L-hook including an L-shaped bar inserted into a perforation on the perforated plate and retained against an underside of the perforated plate.

10. A device for restraining a wheel on a vehicle to a support surface on which the wheel is supported, the device comprising:

(a) a restraining member, comprising:

(i) an upper restraint supported on a upper outer surface of the wheel;

(ii) inner and outer flexible members coupled to and extending from the upper restraint on inner and outer sides of the wheel, respectively; and (iii) a lower restraint coupled to the inner and outer flexible members and abutting a lower outer surface of the wheel; and (b) inner and outer securing means for respectively securing the inner and outer flexible members to the support surface, wherein the inner securing means includes a quick-connect retaining hook including a support member having first and second ends, the first end joined to the inner flexible member, a catch member, coupled proximate the second end of the support member, and an omnidirectional resilient retaining member coupled to the first end of the support member and extending toward the catch member.

11. The device of claim 10, wherein the resilient retaining member is a coiled spring.

12. A device for restraining a wheel on a vehicle to a support surface on which the wheel is supported, the device comprising:

(a) a restraining member, comprising:

(i) an upper restraint supported on a upper outer surface of the wheel;

(ii) inner and outer flexible members coupled to and extending from the upper restraint on inner and outer sides of the wheel, respectively; and (iii) a lower restraint coupled to the inner and outer flexible members and abutting a lower outer surface of the wheel; and (b) inner and outer securing means for respectively securing the inner and outer flexible members to the support surface, wherein the inner securing means includes a quick-connect retaining hook including a support member having first and second ends, the first end coupled to the inner flexible member, an upwardly arcuate first catch member coupled proximate the second end of the support member, and a downwardly arcuate second catch member for retaining an object on the supporting surface when tension is not applied to inner flexible member.

13. The device of claim 12, wherein the second catch member is joined to the first catch member distal from the support member.

14. The device of claim 12, wherein the second catch member is joined to the support member and extends generally toward the first catch member.

15. A quick-connect retaining hook for securing a flexible member to an object, the retaining hook comprising:

(a) a support member having first and second ends, the first end including a coupler securing the support member to the flexible member;

(b) an upwardly arcuate first catch member, coupled proximate the second end of the support member, for securing the flexible member to an object when tension is applied to the coupler by the flexible member; and (c) retaining means for retaining the hook in a generally upright position, the retaining means including a downwardly arcuate second catch member supported by the object when tension is not applied to the coupler by the flexible member.

16. The retaining hook of claim 15, wherein the second catch member is joined to the first catch member distal from the support member.

17. The retaining hook of claim 15, wherein the second catch member is joined to the support member and extends generally toward the first catch member.

18. The retaining hook of claim 15, wherein the center of gravity of the hook is between the first and second catch members; whereby the hook hangs from the object.

19. A device for restraining a wheel on a vehicle to a support surface on which the wheel is supported, the device comprising:

(a) a restraining member, comprising:

(i) inner and outer flexible members coupled to one another and extending over an upper outer surface of the wheel on inner and outer sides of the wheel, respectively; and (iii) a lower restraint including a flexible member coupled to the inner and outer flexible members and abutting a lower outer surface of the wheel; and (b) inner and outer securing means for respectively securing the inner and outer flexible members to the support surface.

20. The device of claim 19, wherein the inner and outer securing means secure the inner and outer flexible members to the support surface proximate opposite ends of the wheel.

21. The device of claim 19, wherein the inner and outer flexible members are formed as an integral strap, and wherein one end of the lower restraint is fixedly coupled to the inner flexible member and the other end of the lower restraint is slidably coupled to the outer flexible member.

22. The device of claim 10, wherein the support member and the catch member are formed as an integral J-shaped body.

* * * * *